Aug. 14, 1934.  G. LERCH  1,970,096
CALCULATING MACHINE
Filed Oct. 16, 1929   13 Sheets-Sheet 5

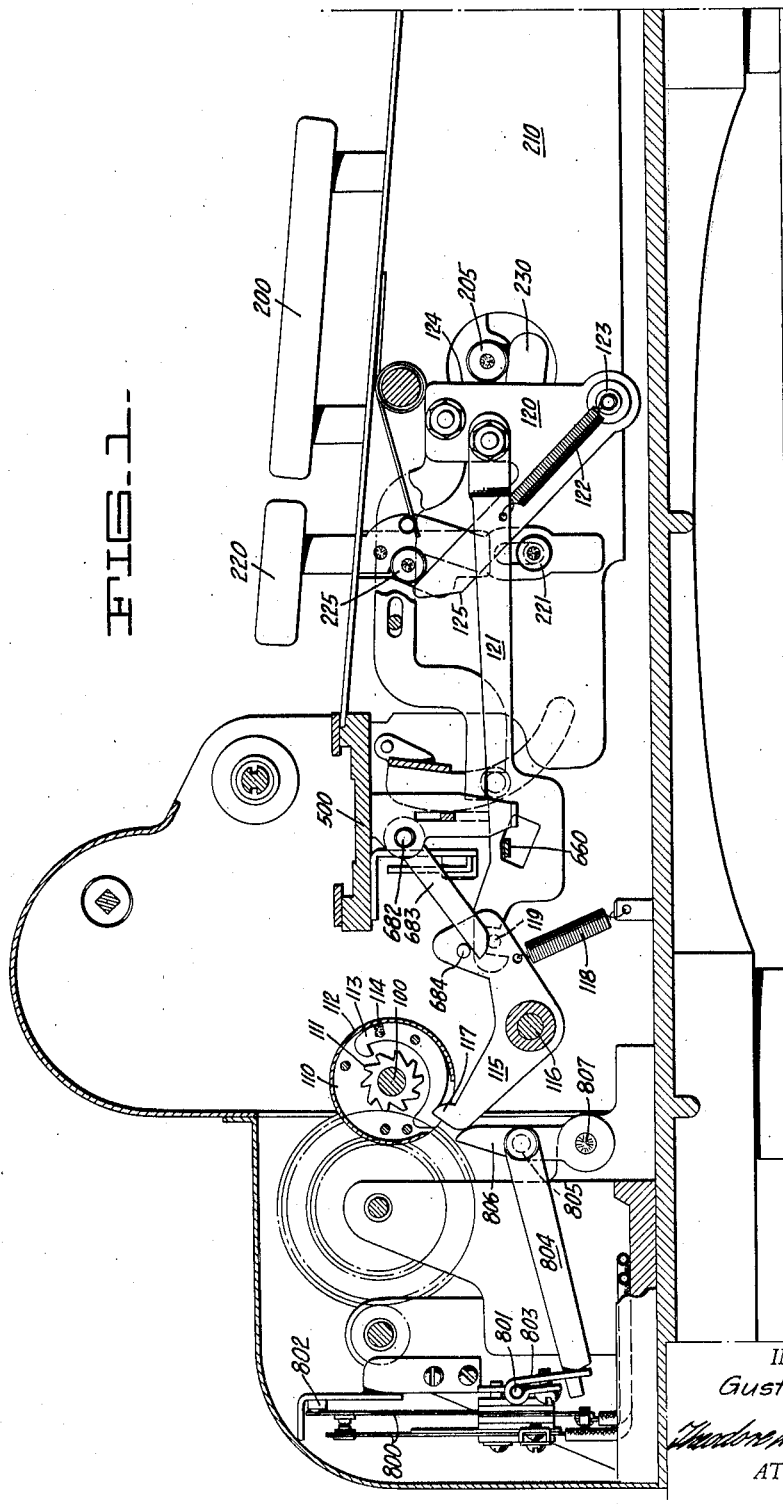

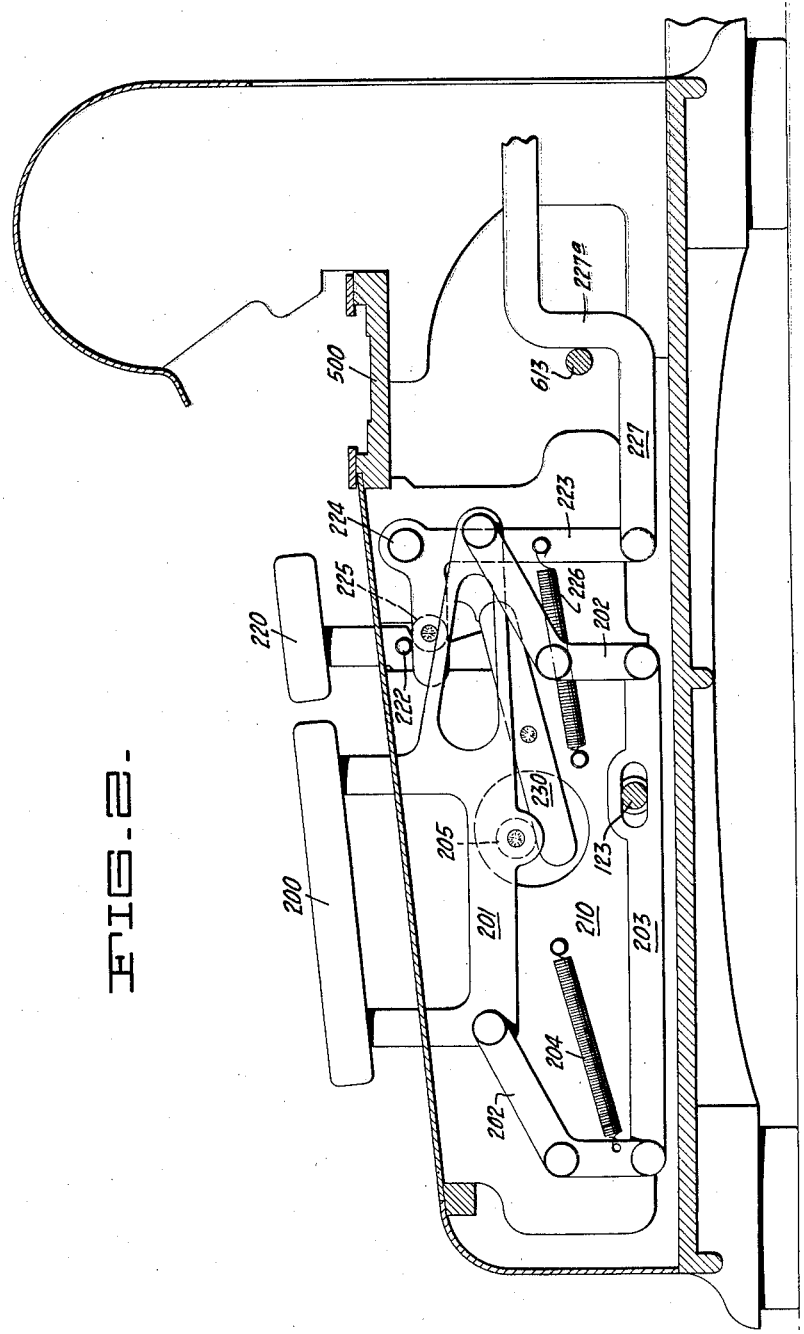

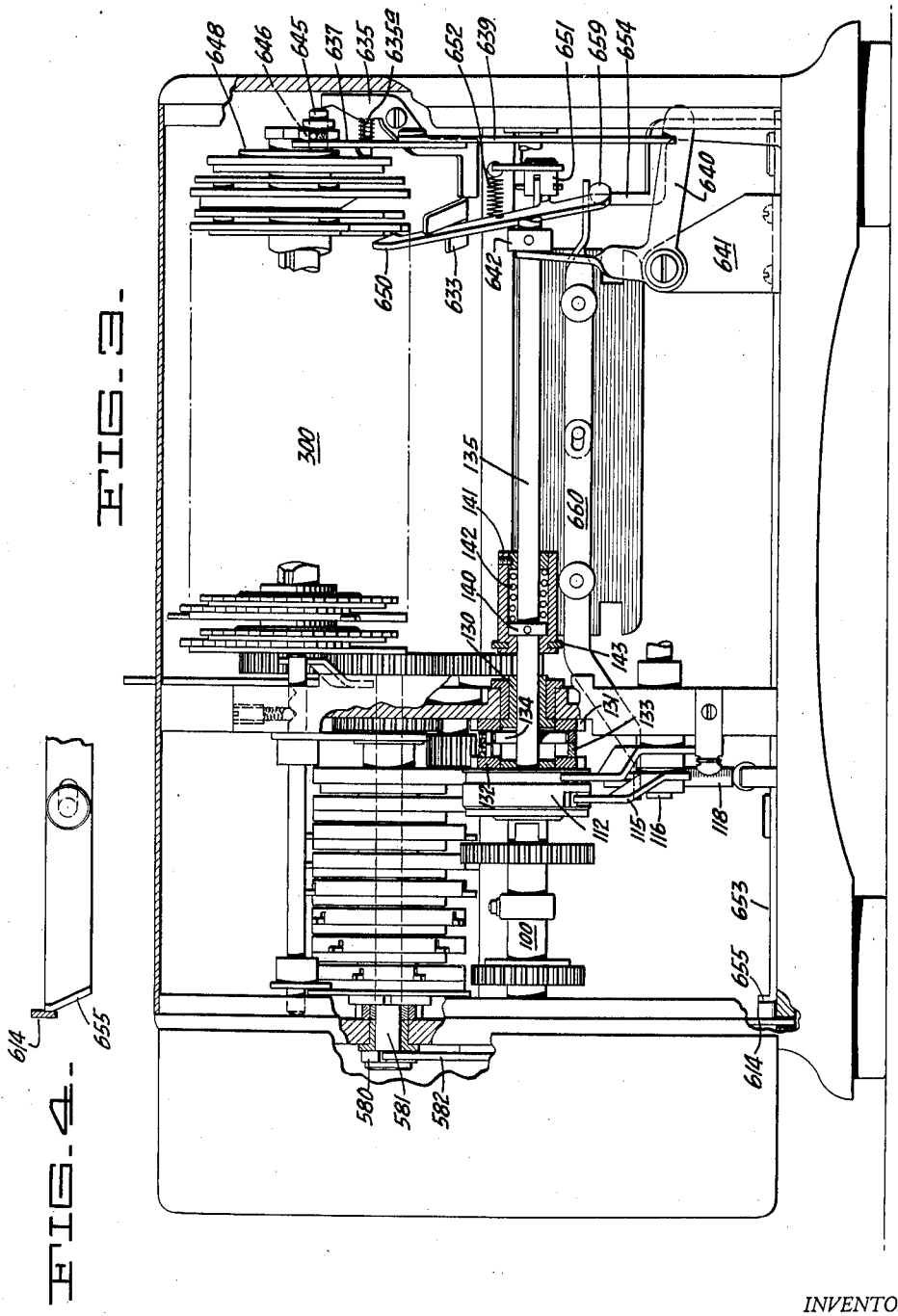

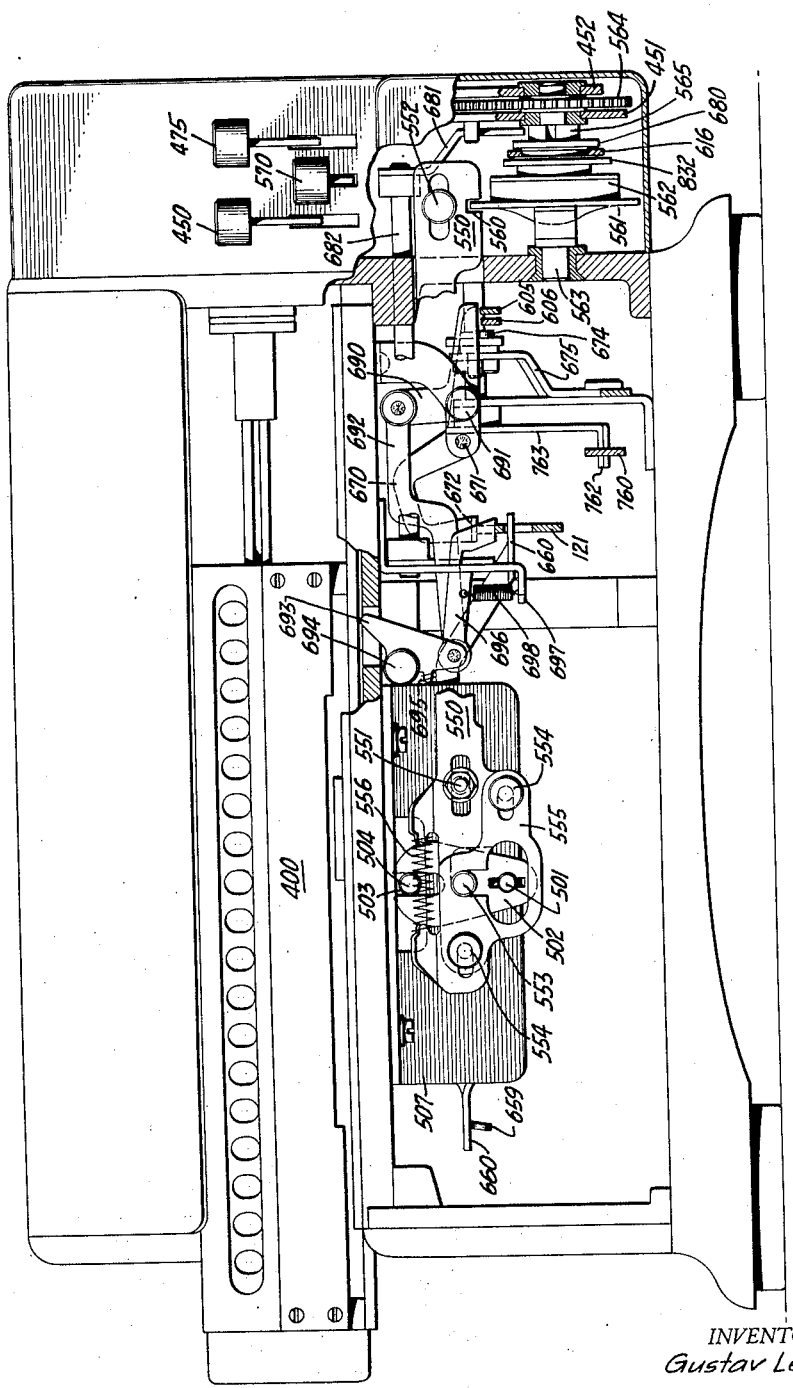

INVENTOR.
Gustav Lerch
BY
ATTORNEY

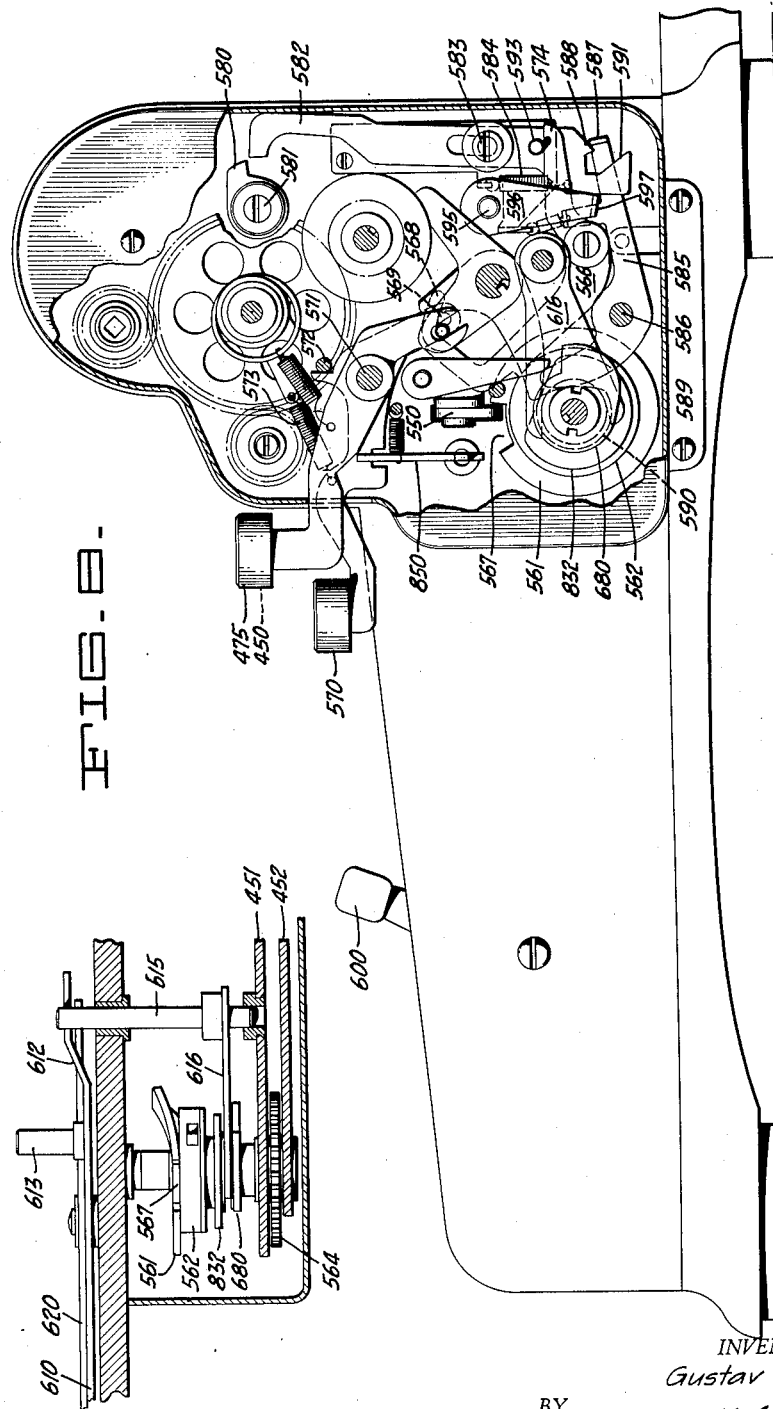

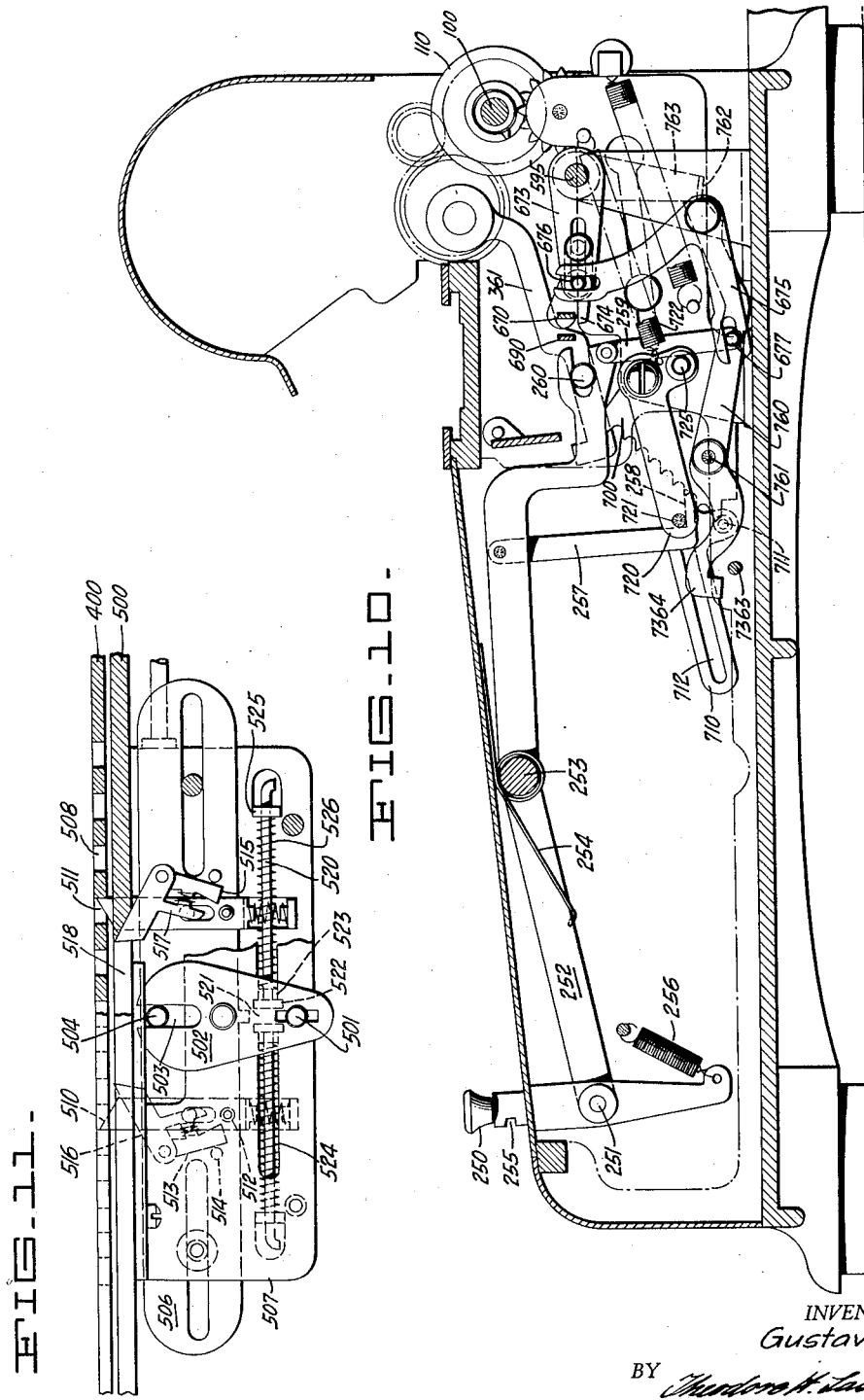

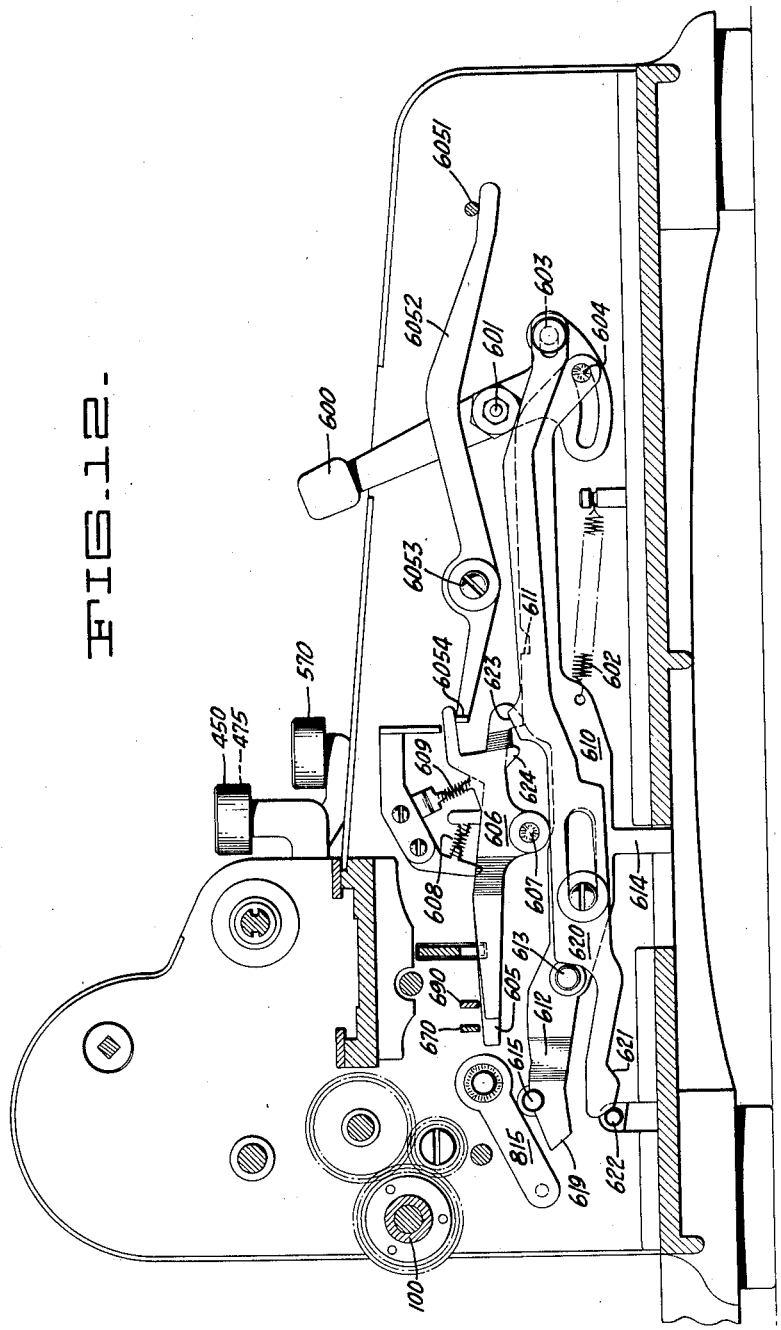

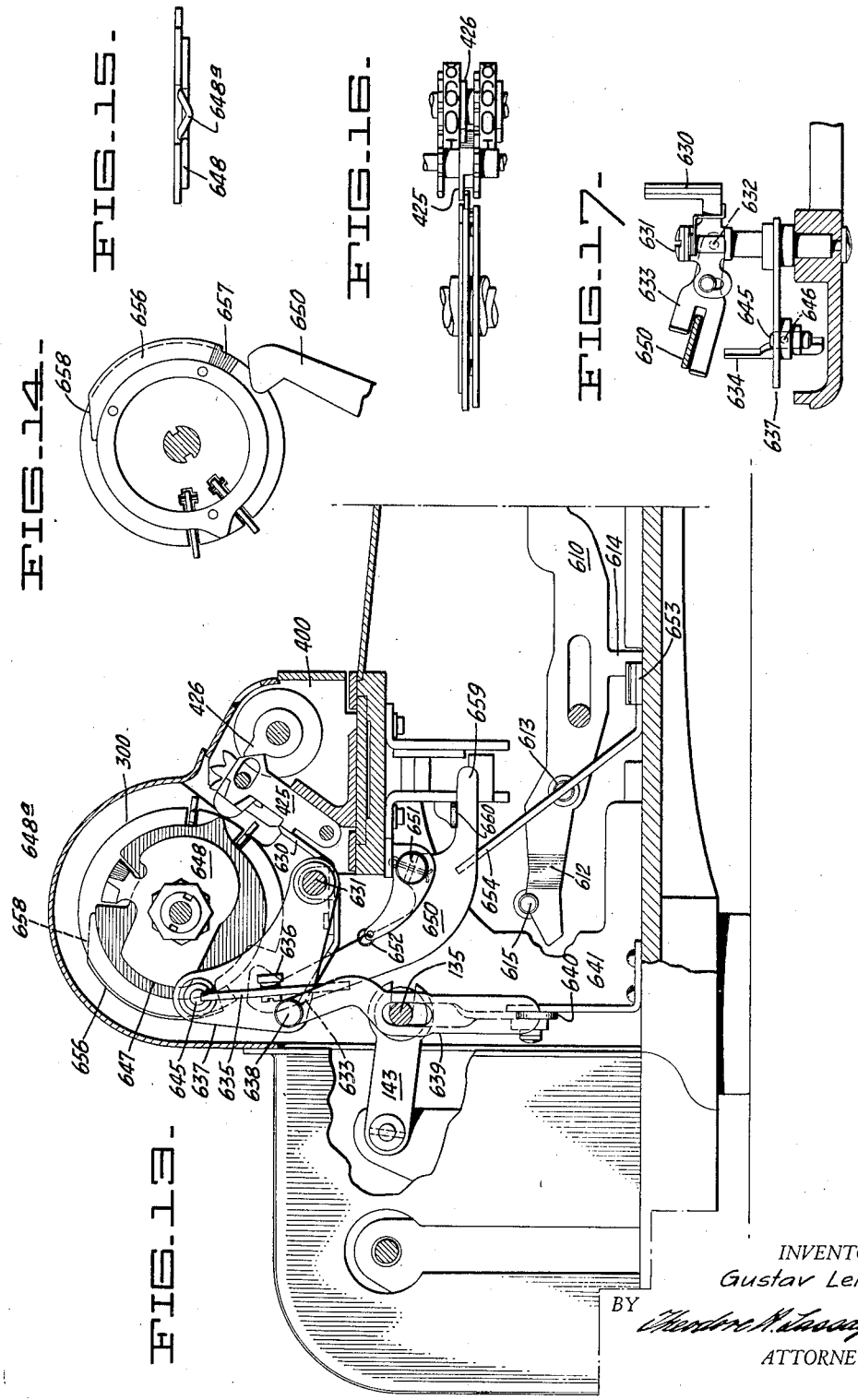

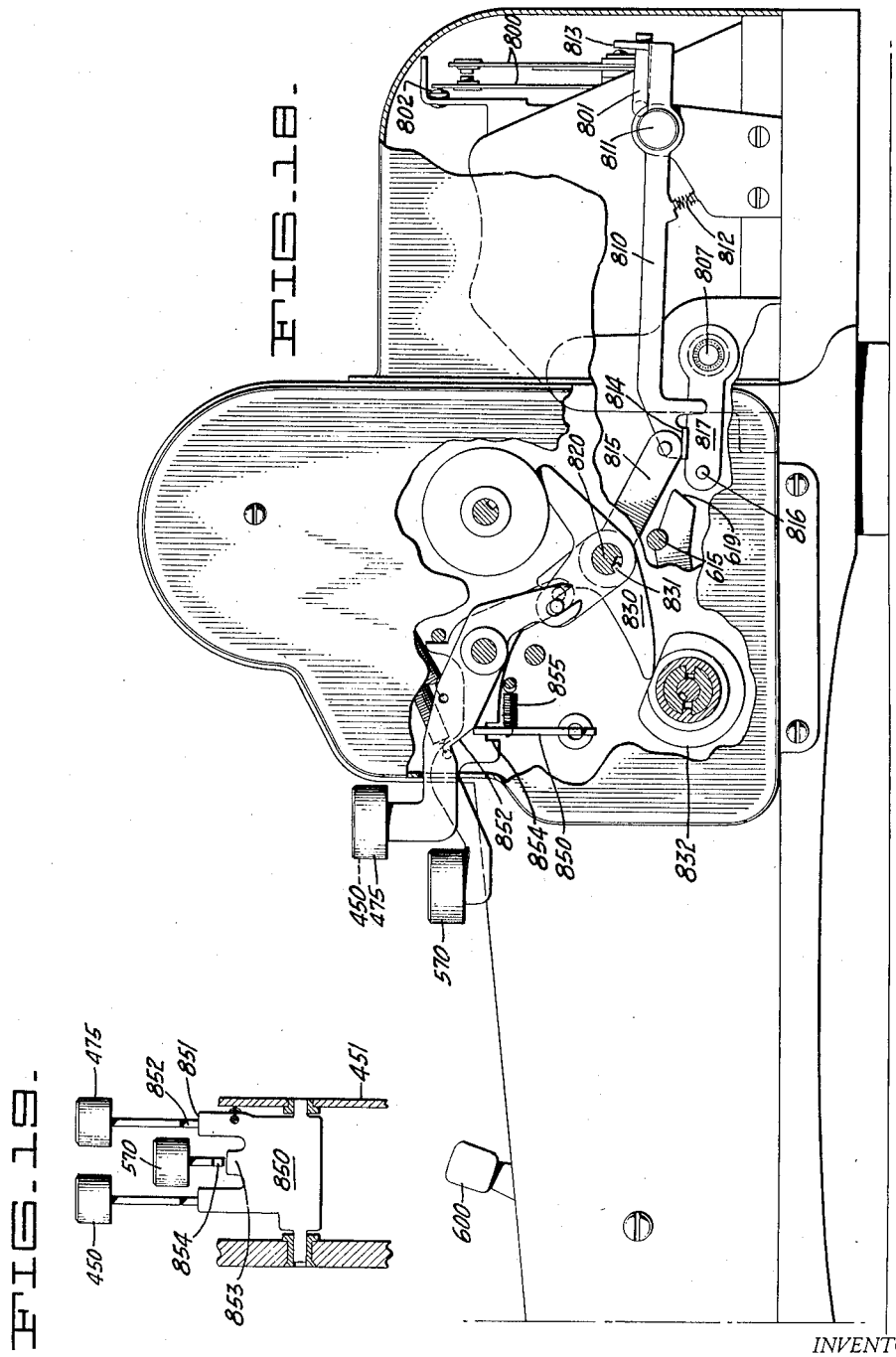

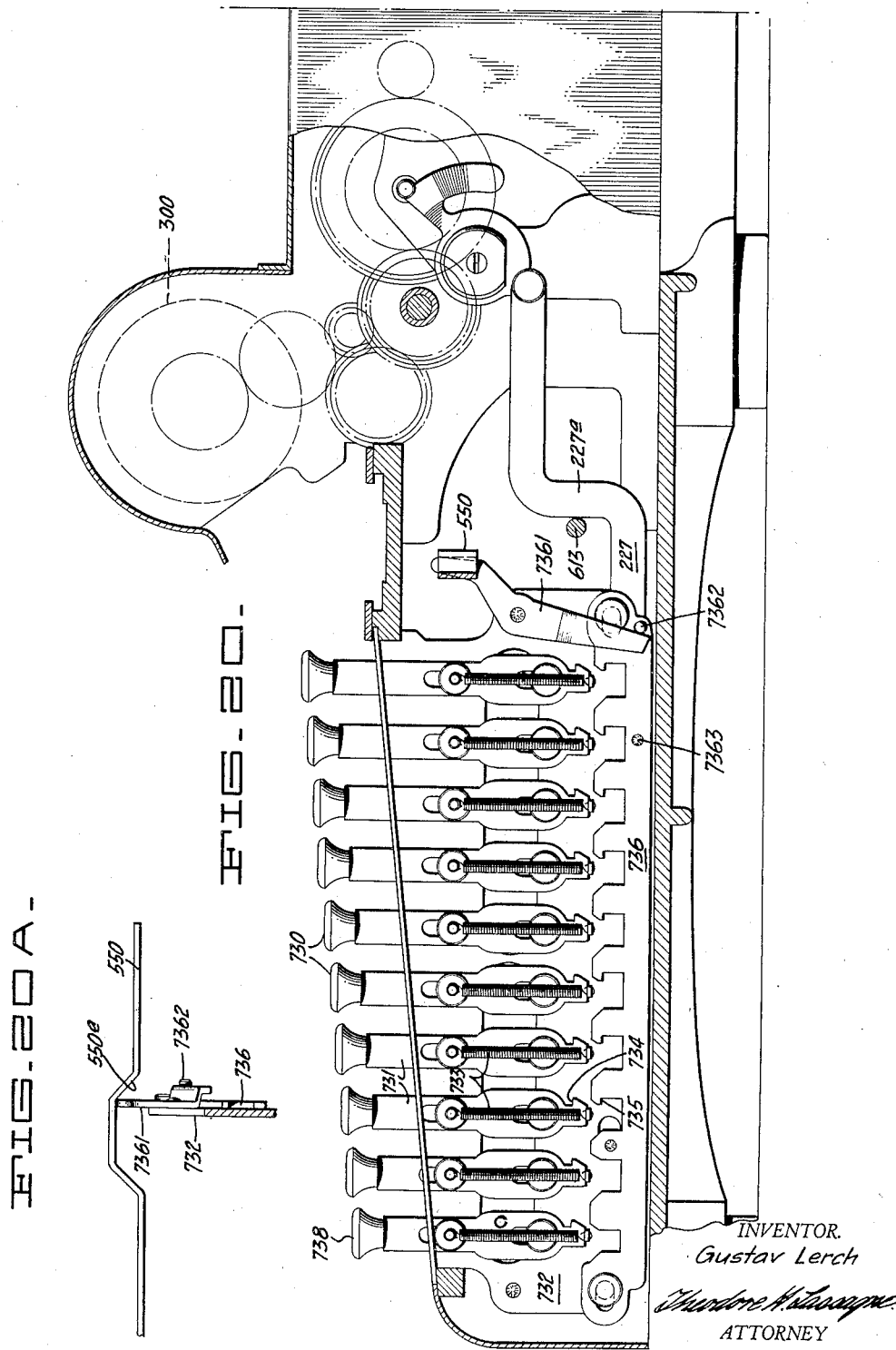

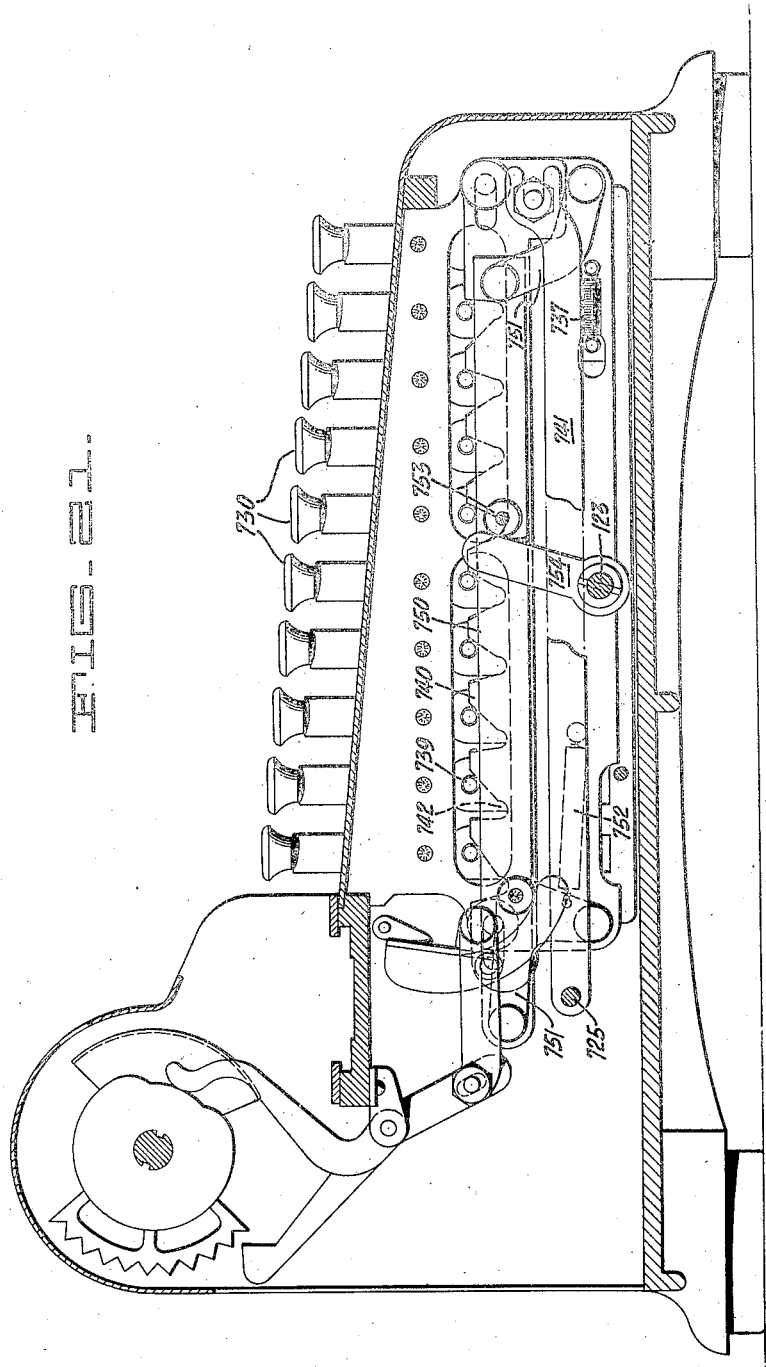

Aug. 14, 1934. G. LERCH 1,970,096
CALCULATING MACHINE
Filed Oct. 16, 1929 13 Sheets-Sheet 13
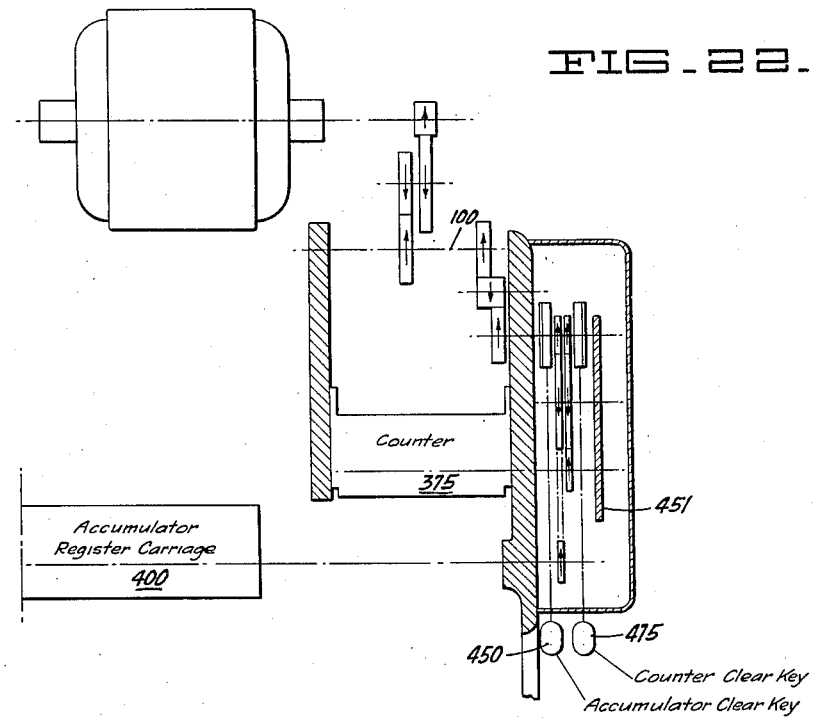
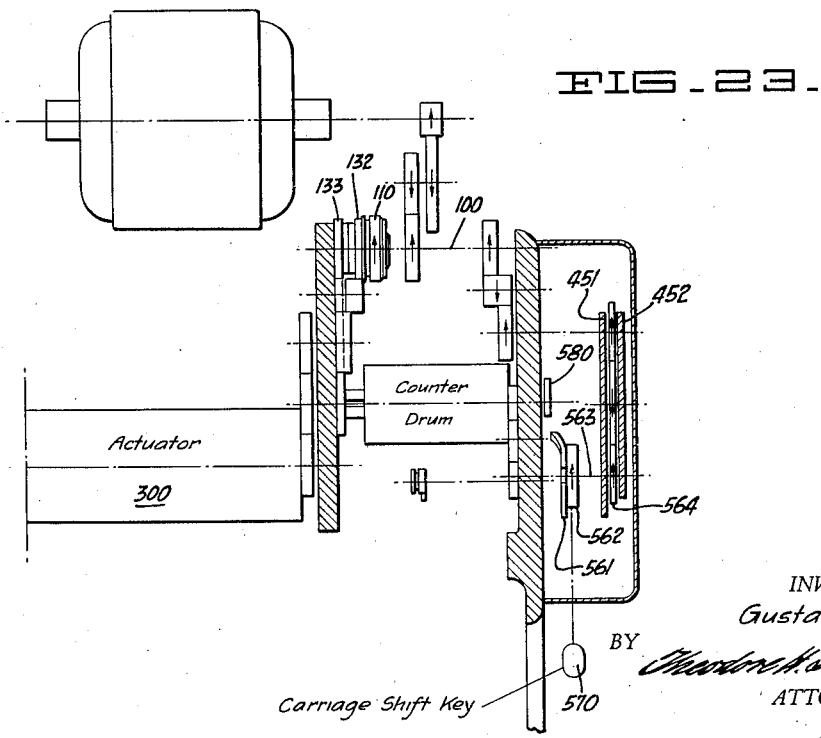
INVENTOR.
Gustav Lerch
BY
ATTORNEY Patented Aug. 14, 1934

1,970,096

UNITED STATES PATENT OFFICE 1,970,096

CALCULATING MACHINE

Gustav Lerch, Oakland, Calif., assignor to Marchant Calculating Machine Company, a corporation of California Application October 16, 1929, Serial No. 399,953

2 Claims. (Cl. 235—27)

The present invention relates to calculating machines and particularly to the type in which the various orders of the accumulator are shiftable into operative relation with different orders of the accumulator actuating mechanism. A machine of this type is shown in the patent to Friden No. 1,643,710 dated September 27, 1927, to which reference is hereby made for a disclosure of mechanisms not specifically described herein.

It is an object of the invention to provide an improved mechanism for the automatic performance of problems in multiplication.

Another object of the invention is the provision of an improved mechanism for shifting the carriage of a calculating machine.

Another object of the invention is the provision of means under control of the carriage shifting means for controlling operations of the automatic multiplication mechanism.

Another object of the invention is the provision of a novel automatic releasing means for the multiplier keys.

Another object of the invention is the provision of a plurality of selectively operable automatic key releasing means for the multiplier keys.

Another object of the invention is the provision of an improved means for disabling the automatic carriage shifting controls.

Another object of the invention is the provision of an improved interlock between certain controlling keys.

Other objects will appear as the description progresses.

The structure hereinafter disclosed constitutes an improvement on the structure disclosed in the application of Gustav Lerch and Carl M. F. Friden No. 390,184, filed September 3, 1929. In said machine, as well as in the machine disclosed in the patent to Friden No. 1,643,710 dated September 27, 1927, the release of the special multiplier keys was accomplished by the movement of the stepped plate operated to terminate the successive additions constituting the computation. When the multiplication operation was made fully automatic by the inclusion of automatic carriage shifting, there was a tendency for operators to take the release of a multiplier key, which occurred at the beginning of a shifting operation, as a signal that the computation had been completed in that order, and they would depress a second multiplier key before the completion of the shifting operation, causing a jam.

In the present machine the control of the multiplier key release has been transferred from the stepped plate to the carriage shifting mechanism which is the last mechanism to operate in automatic multiplication. Thus a multiplier key is not released until it is safe for the operator to depress another for the next operation.

When the "add" key is depressed, the automatic carriage shift is disabled, and the multiplier keys may be used for successive additions. Under this control, therefore, the release of the multiplier keys is transferred back to the stepped plate, since it has become the last element operated in the computation, and after its operation it becomes safe to depress a second key.

In the accompanying drawings forming a part of this specification:—

Figure 1 is a longitudinal section looking toward the right, and showing the drive and power control mechanisms.

Figure 2 is a longitudinal section showing the plus and minus bar structures.

Figure 3 is a lateral section showing the reversing gear and division control mechanisms.

Figure 4 is a detail of a portion of the division control mechanism.

Figure 5 is a lateral section showing the automatic carriage shifting.

Figure 8 is an assembly view of the clearing and shift controls.

Figure 9 is a sectional plan of the shift clutch and controls.

Figure 10 is a longitudinal section of the automatic multiplier unit showing the automatic shift controls.

Figure 11 is an elevation of the carriage shifting mechanism with certain parts broken away.

Figure 12 is a section showing the division control lever and associated mechanism.

Figure 13 is a section showing certain division controls.

Figures 14 to 17 are details of the mechanism shown in Figure 13.

Figure 18 is a section showing the shift and clearing controls with their power control mechanism.

Figure 19 is a detail of the clear and shift key interlock.

Figure 20 is a section showing the multiplier key latch and release mechanism.

Figure 20a is a detail of the multiplier key release mechanism.

Figure 21 is a section of the multiplier key differential mechanism.

Figures 22 and 23 are diagrammatic representations of certain gear trains.

Drive control

Figure 6:
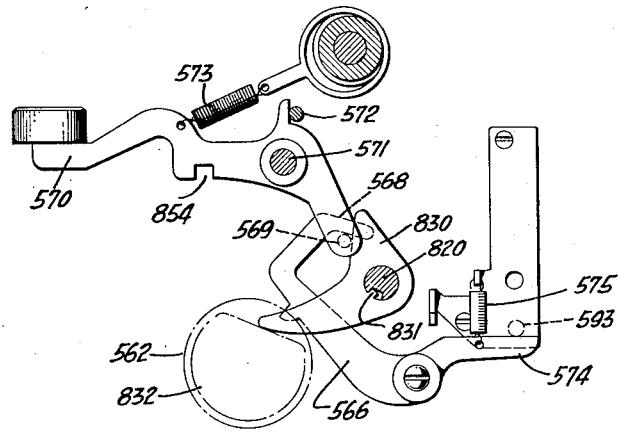
Figures 6 and 7 are details of the shift clutch control.

In the present embodiment, the driving mechanism comprises an electric motor which is connected to the drive shaft 100 by appropriate speed reducing gearing and is adapted to be intermittently connected to the calculating mechanism to drive the same.

The means whereby the drive is connected to the calculating mechanism includes a clutch 110 (Fig. 1), the driving member of which is a toothed wheel 111, fixed on one end of the drive shaft 100. Enclosing the toothed wheel 111 is a circular housing 112 which constitutes the driven member of the clutch, and pivoted within this housing in a position to engage the toothed wheel 111, is a driving pawl 113. This pawl is normally pressed into engagement with the toothed wheel by means of the inset compression spring 114, but is adapted to be maintained in its non-engaging position by means of the clutch control mechanism. The clutch control mechanism comprises a bell crank member 115 journaled on a stubshaft 116 on the machine frame and carrying on one arm a foot 117 adapted, when the actuator is in full cycle position, to project through an appropriately positioned aperture in the clutch housing 112 to engage the tail of the pawl 113 and urge it to clutch disengaging position.

A spring 118, tensioned between a stud on the machine base and the opposite arm of the bell crank 115 tends to urge the foot 117 into clutch disengaging position, so that in the absence of intervention by other instrumentalities the actuator will be brought to rest with the clutch in disengaged position when it reaches full cycle position after a rotation. Means are provided for operating the bell crank 115 to engage the actuator for the number of rotations requisite to perform a desired calculation, and pin 119 is provided on the forward end of the bell crank for this purpose. Pin 119 is engaged by the notched rear end of the control link 121 which is pivoted at its forward end to control plate 120 and normally held in position overlying the pin 119 by spring 122 tensioned between the pivot of the control plate and an intermediate point on the control link. Control plate 120 is fixed on shaft 123 journaled in the machine, and comprises a forward vertical portion 124 adapted to cooperate with the plus bar and a rear angular portion 125, adapted to cooperate with the minus bar. Operation of either of these bars is adapted to impart a counter-clockwise oscillation to control plate 120, as will be hereinafter described. This imparts corresponding counter-clockwise oscillation to the clutch operating bell crank 115, permitting engagement of the driving pawl 113 for the period that such adjustment is maintained. The means whereby the plus and minus bars accomplish this end will be described hereinafter.

Reversing gearing

Fixed to the clutch housing 112 (Fig. 3) for rotation therewith, is a sleeve 130, journaled in an intermediate wall of the machine and journaled upon this sleeve adjacent the clutch housing, are two gears 131 and 132. On their contiguous faces these gears are provided with annular flanges 133, each of which is provided with two oppositely disposed seats of different depth, designed to receive pin 134 fixed in shifting shaft 135, and adapted to engage said seats through oppositely disposed orifices in the sleeve 130. A shifting of the pin 134, then, by means of the shaft 135, causes one or the other of the two gears to be engaged for drive by the clutch housing.

One of these gears include an intermediate idler in its driving train to the actuator, which the other omits, and they therefore serve to drive the actuator in opposite directions, as shown diagrammatically in Fig. 22. This portion of the mechanism is fully disclosed in the patent to Friden, Number 1,682,901, of September 4, 1928. In Figure 3 the pin 134 is shown so positioned as to drive the actuator in the additive direction, into which position it is normally urged by the spring 226 supporting the minus bar. Means are provided for shifting the shaft 135 to carry the pin into engagement with the negative driving gear 132. This means is made resilient so that its control may be superseded by other controls operative in automatic division operations, as will be hereinafter set forth. The shaft 135 carries a fixed collar 140 which is enclosed by a slidable sleeve 141. This sleeve also encloses a compression spring 142, one end of which bears against the collar, and the other end of which bears against one end of the sleeve, thus maintaining the sleeve in such a position over the collar that its other end bears against the collar. The shifting fork shown in Friden Patent No. 1,643,710 engages this collar 141 as shown at 143, and lateral motion thereof tends to shift the shaft 135 and its pin 134 into engagement with either of the two driving gears selectively.

Plus and minus bars

The present invention includes manual means for controlling the rotation of the actuator for a plurality of operations selectively in either a positive or a negative direction. The means for manually controlling rotation in the positive direction comprises a plus bar 200, supported on a frame 201 (see Fig. 2). This frame is supported on one end of a pair of parallel links 202 which are connected together at their opposite ends by a link 203, and are pivoted intermediate their ends to the plate 210. Spring 204, tensioned between the plate and the lower end of the forward link, serves to hold the plus bar in its elevated position. The frame 201 carries a roller 205 which extends through an aperture in the plate 210 and serves to operate the clutch mechanism in the manner hereinafter set forth.

The means for controlling negative rotation of the actuator, comprises a minus bar 220 which is slidably supported on the plate 210 by means of a pin and slot connection 221 (Fig. 1). The minus bar stem carries a pin 222 overlying one end of a bell crank 223 pivoted on the opposite side (Fig. 2) of the intermediate plate 210 at 224, and carrying a roller 225 which extends through the aperture in the plate into juxtaposition with the arm 125 of plate 120 controlling the clutch. Depression of the minus bar thus serves to force this roller downwardly, and to the rear against the action of the spring 226 tensioned between the intermediate plate 210 and the lower end of the bell crank 223, and which serves to hold the end of the bell crank carrying the roller 225 in its most elevated position, and the reversing gear in additive position.

Likewise, depression of the plus bar moves its roller 205 downwardly and to the rear, as a result of the manner in which it is supported upon the parallel links 202. The roller 205 projects through an aperture in the intermediate plate 210, and abuts the forward vertical arm 124 of the control plate 120. The roller 225 likewise projects through an aperture in the intermediate plate 210, and abuts the rear angular arm 125 of the control plate 120. Thus, it will be seen that operation of either bar will result in a counter-clockwise oscillation of the control plate and consequent engagement of the actuator clutch. An interlock, to prevent simultaneous operation of the bars 200 and 220, is provided in the form of a rocking bar 230, pivoted intermediate its ends on the intermediate plate 210. One end of this bar underlies the roller 205 on the plus bar frame, while the other underlies an extension of the roller-carrying arm of the bell crank 223. Depression of either key serves to rock the bar 230 into direct contact with the other member which it underlies, to prevent its concurrent operation. Depression of the minus bar also serves to actuate the reversing gearing by causing rearward motion of the link 227, pivoted to the lower end of bell crank 223. Rearward motion of the link 227 oscillates a worm cam playing in a slot in the shaft which carries the gear shifting fork as shown in the Friden Patent No. 1,643,710 above referred to. The reversing mechanism proper has, however, been modified as hereinbefore explained to permit a reversal of the direction of rotation of the actuator without effecting a disengagement of the clutch, under certain conditions.

Add key

A special key 250 designated as the "add key" is provided to control the various mechanisms in the performance of addition. This key 250 is pivoted at 251 to a lever 252 pivoted at 253 and supported by spring 254. The upper end of the key stem is provided with a notch 255 adapted to engage the cover plate upon depression of said key to temporarily retain it in operative position. A spring 256 tensioned between the lower end of the key stem and a fixed portion of the machine tends to rock the key into latching position.

The rear end of lever 252 is bifurcated and engages a pin 260 on a pitman 261 driven by the machine, and operative when raised into operative position by the depression of key 250 to release the keys at the end of each cycle of operation. The operation of this pitman in releasing the depressed keys is fully disclosed in the patent to Friden No. 1,643,710 of September 27, 1927.

The key 250 also controls the automatic multiplier and carriage shifting mechanisms as will be hereinafter set forth.

Actuator, accumulator and counter

The actuator drum 300, the counter 375 and the accumulator 400 are substantially identical in construction and operation with the corresponding mechanisms disclosed in the patent to Friden, No. 1,643,710 of September 27, 1927, and will not be specifically described herein, reference being had to the said prior patent for a disclosure of these mechanisms. It is sufficient to point out, herein, that the actuator sections are capable of differential adjustment by their associated key sections to effect entry of the numbers set therein into the associated accumulator upon rotation of the actuator drum, the entry being additive or subtractive depending upon the direction of rotation of the drum.

It is understood that the term accumulator, as used herein, applies to a mechanism including numeral wheels operable in opposite directions for addition and subtraction, and is not limited to a bank of numeral wheels operable in one direction only. "Entry" of an item may therefore be either additive or subtractive, and the direction of rotation of the numeral wheels composing the accumulator will be controlled accordingly.

Carriage shifting mechanism

The accumulator carriage 400 is slidably mounted on a trackway 500 under which is arranged mechanism for manually or automatically shifting the carriage in either direction.

The carriage shifting mechanism may be operated by movement of a hand lever (not shown), arranged at the foot of the machine, in one direction or the other depending upon the desired direction of movement of the carriage. The lever is secured to a shaft 501 journaled in the casing and having its rear end disposed below the carriage track. Secured to the rear end of the shaft 501 is a plate 502 having a slot 503 therein which engages a pin 504 on the slide 506 supported on the frame 507. The carriage is provided on its under surface with a plurality of spaced depressions 508 having a spacing equal to the spacing of the numeral discs of the accumulator.

Mounted on the frame 507 and slidable vertically therein are two upwardly spring pressed dogs 510 and 511 having bevelled upper ends adapted to engage against the sides of the depressions or apertures 508 on the under side of the carriage. The dog 510 bears against the left side wall of a depression, preventing movement of the carriage to the right and the dog 511 bears against the right side wall of another depression, preventing movement of the carriage to the left. The carriage is thus normally locked in position against longitudinal movement and due to the use of two dogs, has no side play. Arranged on each dog is a roller 512 which is engaged by a pivoted dog to depress the latch. Pivoted on the slide 506, adjacent each dog, is a dog 513, which is prevented from moving backward, away from the roller 512 by a stop 514 on the slide. When the slide is moved to move the dog 513 toward the roller, the lower flat inclined surface 515 of the dog 513 rides over the roller 512, forcing it and its associated sliding dogs downward, out of contact with the carriage. Pivoted to the slide 506 on the same axis as the dog 513, is a pawl 516, which, when released, is forced upward by the spring 517 interposed between the pawl and the dog 513. The pawl extends through an aperture or elongated slot 518 in the trackway 500, and is normally held out of engagement with the carriage, by contact with the end of the slot. The slot 518 is provided with bevelled ends against which the pawl 516 lies, the angle of the bevel corresponding to the slope of the upper surface of the contacting pawl, when the pawl is in normal position as shown in Figure 11. Due to the bevel, the length of the slot on the upper surface of the track 500 is less than its length on the under face. The length of the slot on the upper face is equal to the distance between the adjacent ends of the pawls 516 when the pawls are in normal position. When the slide 506 is moved toward the left, the right hand dog 513 depresses the dog 511, releasing the carriage so that it may be moved toward the left. Simultaneously, the right hand pawl 516 moves upward into the next depression in the carriage and continued movement of the slide to the left causes the right hand pawl 516 to move the carriage to the left.

As the carriage is moving to the left and before it reaches the end of its throw, the right hand dog 513 passes from the roller 512, permitting the dog 511 to spring upward into the next depression in the slide, to the right of the depression from which it was withdrawn, so that the dog is in position to stop the movement of the carriage at the end of its step of movement. On movement of the carriage to the left, the dog 510 is depressed by engagement of the side of the depression with the bevelled side of the dog and springs into the next depression after the carriage has been moved one step. As the slide moves back to its central or neutral position, the right hand dog 513 snaps over the roller 512 to its normal position against the stop 514. Associated with the dog 510 is a corresponding dog 513 and latch 516, together with the other elements which function as indicated above for movement of the carriage to the right.

Means are provided for returning the slide 506 and the hand lever to neutral or central position, after the movement of the slide one step in either direction. Supported on the frame 507, below the slide 506, is a rod 520 which extends through an aperture in an ear 521 on the lower side of the slide at substantially the center thereof. Disposed on the rod 520 at each side of the ear 521 is a washer 522 provided with a stud or projection 523, the projections seating in the alined slots 524 in the frame 507, the slots being of such length that when the studs are positioned at the adjacent ends of the two slots, the ear is held in central or neutral position. Arranged on each end of the rods, between the washer 522 and the ear 525, through which the rod passes, is a normally inactive spring 526 which tends to hold the washer at the end of the slot. The springs tend to return the slide to neutral or central position, after it has been moved in either direction by the hand lever. Movement of the slide in either direction, compresses the spring on the side toward which the slide is moved, but does not in any manner vary the compression of the other spring, which remains inactive. The slide is thus centered after each movement of the carriage.

Motor driven carriage shift

Means are provided for effecting power shifting of the accumulator carriage relative to the several denominational orders of the actuator, either under control of the machine function controls which are operative in multiplication and division as automatically performed by this machine, or under manual control by means of a special key.

For this purpose a link 550 (see Fig. 5) is provided, adapted to be operated by the driving motor to operate the carriage shifting mechanism hereinbefore described. This link is designed to impart a quickly accelerated motion to the carriage through approximately the first half of its step of movement, whereupon the acquired momentum is sufficient to complete the shift. The construction which makes this possible has the additional advantage of permitting idle movement of the link in the event of a locking of the carriage mechanism, thus preventing a jam.

The link 550 is slidably supported in the machine by pin and slot connections 551 and 552 to stationary portions of the frame and is provided adjacent plate 502 with a cut-out portion through which pass rod 501 and pin 553, said cut-out portion being large enough to permit free movement of the link without affecting these elements. Attached to the end of link 550 by pin and slot connections 554 is a plate 555, having an aperture through which passes rod 501, and a slot embracing pin 553. A compression spring 556 disposed between opposite anchors on plate 555 and link 550 tends to maintain plate 555 in its leftmost position with relation to link 550 (Fig. 5), in which position the plate 502 is in its vertical or neutral position.

The right end of link 550 is provided with a notch 560 cooperating with a peripheral cam 561 on the housing of the carriage shift clutch 562, to impart a leftward reciprocation to link 550 on each rotation of the cam 561.

As the link is moved to the left by the cam, the spring 556 is slightly compressed due to the inertia of the carriage and shifting mechanism, but as the carriage is started in motion it expands, accelerating the carriage sufficiently to carry it a full step although the link moves only a distance equal to a half step. In the event that the carriage is locked against movement, the spring 556 will merely be further compressed by the movement of link 550 and no jam will result.

The shaft 563, which drives the clutch 562, is journaled between the side frame of the machine and additional supporting plates 451 and 452. It is driven by an extension of the gear train from the resetting clutch shaft, as indicated in Figs. 22 and 23, the terminal gear only of the train being shown at 564. The shaft 563 also carries a sleeve 565 rigid with the clutch housing 562, and to which are keyed the two cams 832 and 680. These cams are always driven when the carriage shifting clutch is engaged, but are adapted to be shifted laterally on the sleeve 565 by means of the shifting fork 616, to selectively engage their respective cooperating members for a purpose and by a means hereinafter to be described.

The clutch 562 is of the same pawl and ratchet wheel type as the main actuator clutch and is adapted to be engaged for one or more rotations by retraction of its operating arm 566 (Fig. 6) from contact with its internal pawl. The operating arm 566 is adapted when in clutch disengaging position to hold the clutch housing 562 in a definite full cycle position in the same manner that the main actuator clutch is so held. When the clutch housing 562 is held in full cycle position a notch 567 (Figs. 8 and 9) in the periphery of the cam 561 underlies the carriage shift operating mechanism link 550 so that the link may be freely shifted in the operation of the manual carriage shifting mechanism. The clutch operating arm 566 (Fig. 6) is provided with an upper hooked portion 568 arranged to overlie pin 569 on the lower end of the clutch operating key lever 570. This key lever is journaled on shaft 571 and is urged to its non-effective position against stop 572 by spring 573 tensioned between the forward end of the key and a convenient shaft of the machine. The arm 566 is also provided with a tail 574 for automatic operation as will be hereinafter set forth, and is urged to clutch disengaging position by spring 575 tensioned between this tail and the frame.

Automatic control of carriage shifting

Figure 7:
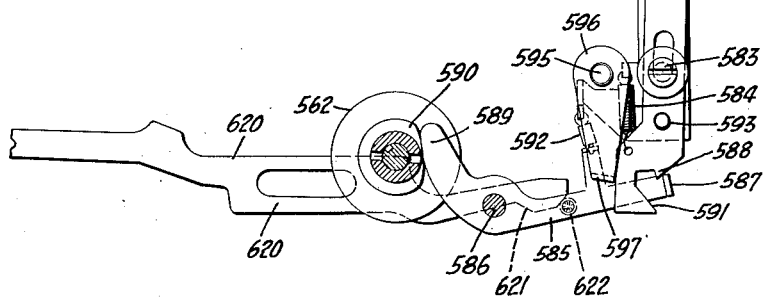

Automatic means are provided for engaging the carriage shift clutch at the proper time in automatic multiplication and automatic division operations. Automatic carriage shifting always occurs at the end of an additive rotation of the actuator in automatic multiplication immediately after the last successive addition in each denominational order, and in automatic division at the end of the additive rotation which corrects the overdraft in each denominational order. The shift clutch engaging means is therefore arranged to be driven with the actuator in additive rotation and controlled from the appropriate machine function control. A tripping finger 580 (Figs. 3, 7 and 8) is therefore arranged on the side frame end of shaft 581 which extends through the sleeve carrying the counter transfer drum and is connected to an intermediate gear of the actuator drive train. Regarding the machine from the right side thereof it will be observed that the actuator rotates in counter-clockwise direction for addition. It will thus be seen that in additive rotation of the actuator the tripping finger 580 is rotated in a clockwise direction, regardless of the direction of the counter drum which is independently reversible.

A trip slide 582 is arranged to be vertically reciprocated by the trip finger 580, as the actuator approaches full cycle position, and for pivotal oscillation by its control member 596 to bring it in and out of the path of the trip finger 580, by means of a pin and slot connection 583 through which it is supported on the machine frame. A spring 584, tensioned between the machine frame and the lower arm of the member 582, tends to oscillate it in a clockwise direction and carries it out of the path of the trip finger. A latching member 585, pivoted at 586, has a laterally bent end portion 587, adapted to latch behind a tooth 588 on the trip slide 582 to retain said slide in an active position in the path of tooth 580 until the shift clutch is actuated. The tail 589 of the latch member cooperates with a cam 590, fixed to the shift clutch housing. On rotation of the shift clutch housing, this cam causes the latched member to be rotated in a clockwise direction, bringing its laterally bent end 587 against the cam face 591 of the trip slide and positively camming it out of the path of the tooth 580 to prevent a second actuation of the shift clutch. Spring 592 tensioned between the machine frame and the latch lever, normally tends to hold it in position to engage behind tooth 588. The trip slide 582 carries a pin 593 overlying the tail 574 of the shift clutch operating lever 566 which operates on vertical reciprocation of the trip slide by tooth 580 to withdraw the clutch control arm 566 and permit engagement of the shift clutch. A control shaft 595, journaled in the side frame of the machine, carries a depending lever 596, having a laterally bent end portion 597, lying in contact with the front side of the trip slide 582. The lower end 597 of the lever 596, when moved to the rear by means of control shaft 595, will oscillate the trip slide 582 into its effective position where it will be latched. This control shaft will be oscillated at the proper times in automatic computations hereinafter described, to initiate carriage shifting.

Automatic division

Automatic division is performed in the present machine upon entry of the factors in the usual manner, setting the carriage and shifting the division lever into its forward position, whereupon the following operations ensue wholly automatically, and the quotient is accurately registered in the counter mechanism. Shifting of the division lever starts the actuator in the subtractive direction, and it acts to subtract the selected decimal multiple of the divisor from the dividend, registering the number of subtractions in the counter in the usual manner, until an overdraft occurs. The occurrence of an overdraft operates controls which effect a reversal of the actuator driving gear without effecting a disengagement of the actuator driving clutch. The cycle immediately following upon the overdraft cycle therefore corrects the overdraft and a control operative in this cycle acts to disengage the actuator clutch in full cycle position and to engage the carriage shift clutch for a single cycle. The carriage shift clutch approaching the termination of its cycle of operation actuates controls to reengage the actuator clutch and again drive the actuator in subtractive direction. This tour of operation repeats itself successively in consecutive denominational orders until the carriage reaches home position, when a special control intervenes to prevent engagement of the carriage shift clutch and all the mechanism is consequently brought to rest with all controls restored to their normal position.

The automatic division lever 600 (Fig. 12) is pivoted at 601 to the side wall of the machine, and its upper end is rocked toward the front of the machine to initiate a division operation. By this motion it moves toward the rear of the machine main division slide 610, and supplemental division slide 620, against the force of spring 602 tensioned between the base of the machine and the main division slide. The short pin and slot connection 603 connects the supplemental division slide to the division lever so that this slide follows the movement of the division lever in both directions. The main division slide is, however, connected to the division lever by a longer pin and slot connection 604.

This longer pin and slot connection 604 is so arranged that the main division slide will be pushed to the rear by a forward rocking of the division lever, but will not be returned by a return of the division lever to inoperative position. A pair of latching pawls 605 and 606 are pivoted side by side on the side frame of the machine at 607. The heads of both these pawls cooperate with a notch 611 in a widened portion of the main division slide, into which they are pressed by their individual springs 608 and 609, compressed between the forward portion of the respective pawls and an extension of the side frame. By this means the main division slide 610 is latched in the rear position to which it is forced by an operation of the division lever 600 until the two latching pawls 605 and 606 are concurrently raised.

Adjacent its rear end the main division slide 610 has a camming bend 612 which cooperates with a notch in shaft 615 to shift the shaft laterally on a movement of the slide. Shifting of this shaft operates the shifting fork 616 fixed adjacent its opposite end which controls the positioning of cams 832 and 680 for a purpose presently to be described.

Spaced from its rear end the main division slide 610 carries a laterally extending pin 613, the remote end of which lies directly in front of a vertical portion 227a (see Fig. 2) of the link which controls the actuator reversing gear. Rearward motion of the slide 610 then serves to move the link 227 and place the gear control in position to cause subtractive rotation of the actuator.

Concurrently, the bell crank 223 (Fig. 2) attached to the forward end of link 227, is rocked and the upper arm carrying roller 225 is moved downwardly, the roller being carried downwardly and toward the rear of the machine, in the same manner as when actuated by the minus bar. In this motion it rocks control plate 120 to cause engagement of the main actuator clutch 110. This mechanism is locked in this position for the duration of the division operation by the latches holding the main division slide in its rearward position. The actuator, being thus set in motion, rotates continuously, subtracting the divisor or its decimal multiple from the dividend set in the accumulator carriage at each successive rotation until an overdraft occurs. In an overdraft operation, as is well known in the art, a borrowing carry operation occurs which results in all effective numeral wheels to the left of those actuated, being operated from their normal zero registration to a nine registration.

The movement of the familiar carrying mechanism of the machine in this operation is utilized to control the reversal of the actuator to effect a correction of the overdraft. The carry mechanism includes carrying levers 425 (Figs. 13 and 17) normally latched in their forward position as shown, but adapted to be tripped to and resiliently latched in their rearward position by a lug 426 on the numeral wheel in a direct transit from zero to nine. Abutting directly behind the carry lever 425 of the numeral wheel cooperating with the next to last carrying order of the actuator toward the left, is a lever 630 pivoted to the machine frame at 631. The pivot 631 permits movement of lever 630 in a vertical plane when its carry lever 425 is tripped. Pivoted for movement in a horizontal plane, to the end of the lever at 632, is a bifurcated tail piece 633. This tail piece is movable on its pivot by means under control of the main division slide, presently to be described in connection with the means for terminating the additive correction stroke, and in its operative position overlies the foot 634 of a vertical lever 635 pivoted at 636 on a second lever 637 which is also pivoted to the machine frame at 631. Pivoted to the lever 637 at 638 is a depending link 639 (see also Fig. 3), the lower end of which engages one arm of a bell crank 640 pivoted to a standard 641 on the machine frame. The upper arm of the bell crank 640 operates against a collar 642 on the shaft 135 in such a manner that rocking of the bell crank brought about by downward pressure on link 639, shifts the shaft 135 so that it carries its pin 134 into engagement with the gear 131, which serves to drive the actuator in the positive or additive direction. This shift is positively brought about by means driven from the actuator and controlled by the numeral wheels in an overdraft operation.

In an overdraft operation the carrying lever 425 of the controlling denominational order is rocked to the rear carrying with it the lever 630 and depressing its tail piece 633. This depresses the foot 634 of the vertical lever 635, rocking said lever against the pressure of spring 635a to depress a pin 645 slidably arranged in a socket in the upper end of lever 637 and arranged to be retained in either of its two adjusted positions by a spring pressed ball indicated at 646. These operations occur just before the actuator reaches its full cycle position and their result is to project the end of pin 645 into a position where it will be engaged by a specially formed cam face 647 on a plate 648 fixed on the left end of the actuator shaft. This engagement taking place while the actuator is still under drive in the negative direction, drives the system including lever 637, link 639, bell crank 640, and shaft 135 to positively carry the pin 134 out of its seat in gear 132 and into its seat on gear 131, just as the actuator reaches full cycle position, and against the force of spring 142 which is compressed in this operation, rendering unnecessary a release of the link 227 which normally controls the position of pin 134 and also controls the main actuator clutch. Thus the actuator is reversed without disengaging the main clutch and enters upon an additive cycle.

Pressure on the linkage system above outlined, is at once relieved upon reversal of the actuator, but a reseating of the pin 134 in gear 132 seat under pressure of spring 142 is prevented by the displacement of the seat, and reversal in half cycle position is prevented by the relative speed with which the two gears 131 and 132 are rotated. At the end of a single cycle of additive rotation, the actuator is arrested in full cycle position by disengagement of the main clutch and spring 142 is permitted to reseat pin 134 in seat in gear 132.

Clutch disengagement at the end of the corrective additive rotation is accomplished under control of a lever 650, doubly pivoted for limited universal movement at 651. A spring 652, tensioned between the upper portion of the lever and a fixed portion of the framework, urges the lever toward its operative position but it is normally maintained in inoperative position by a link 653, one end 654 of which abuts against the tail of the lever 650 on the side opposite the spring and the other end of which is formed with a cam face 655 (see also Fig. 4). When the main division slide 610 is in its inoperative position, a depending arm 614 thereon lies in the path of the link 653 and prevents it being forced to the left, in Figure 3, by the force of spring 652, thus maintaining the lever 650 in its inoperative position. However, when the main division slide 610 is moved rearwardly to its operative position, the depending arm 614 is carried out of the path of the link 653 and the spring 652 is permitted to move the lever 650 into operative position. The upper arm of this lever lies in the fork of the bifurcated tail piece 633 hereinbefore referred to, and this tail piece is carried to its operative position along with the lever. In its operative position the end of the lever 650 lies in the path of a cam 656 (see also Fig. 14) carried on one of the actuator segments. The end of the camming member which approaches the lever during subtractive rotation of the actuator, carries a side bevel 657 which acts to move the lever 650 aside without tripping it, but the end which approaches the lever in additive rotation of the actuator carries a cam face 658 which acts to rock the lever 650 about its vertical pivot, lifting its tail 659. This tail underlies and thus acts to lift one end (see Fig. 3) of a double lever system 660, expediently pivoted in the machine, the other end (see also Fig. 5) of which lies in an aperture in the rearward end of the actuator clutch control link 121. The lift exerted on the one end of the double lever system 660 causes a corresponding lift at the other end, raising the clutch control link 121 clear of pin 119 on the actuator clutch control bell crank 115. Thus released, the bell crank 115 at once contacts the clutch housing 112 under urge of spring 118, and as the clutch reaches full cycle position, the foot 117 enters the aperture in the clutch housing and disengages the clutch, locking the actuator in full cycle position. During the additive rotation just completed a cam 648a (see Fig. 15) formed on plate 648 acts to restore pin 645 to its normal inoperative position.

Means are provided for causing automatic engagement of the carriage shift clutch upon disengagement of the main actuator clutch. A lever 670 (Fig. 5) pivoted at 671 on a rigid member dependent from the carriage track, has an angular tail portion 672, overlying the clutch control link 121, and a nose overlying locking pawl 605 and the nose 674 of a lever 673 fixed on control shaft 595. When the control link 121 is raised to arrest the actuator at the end of the corrective additive rotation, the pawl 670 is rocked clockwise and its nose depresses lever 673 (see also Fig. 10), rocking control shaft 595 to trip the automatic carriage shift control mechanism as hereinbefore set forth.

The carriage shift clutch 562 then proceeds through a single cycle of operation at the end of which a cam 680 on the sleeve 565 which cam has been moved into cooperative relation with arm 681 by the setting of the main division lever, trips said arm, rocking the shaft 682 to which it is fixed. The opposite end of this shaft carries an arm 683 (Fig. 1) underlying a pin 684 on the actuator clutch control crank 115. Rocking of the shaft 682 consequently rocks the bell crank 115 to reengage the main actuator clutch and it is latched in this position by a reengagement of the pin 119 in the notched end of control link 121, until the end of a subsequent corrective addition cycle when said link is again lifted. The tour of operations thus repeats itself in consecutive denominational orders until the carriage reaches home position.

Means are provided for terminating the calculation at the end of a tour of operations if the carriage is in its home position. Pawl 690 (Fig. 5) pivoted at 691, has a nose overlying both latches 605 and 606 which it trips concurrently, completely releasing the main division slide 610 so that it may be returned to inoperative position by its spring 602 to terminate a calculation. A link 692 connects the tail of lever 690 with one end of a finger 693 pivoted at 694 and positioned to project through an aperture in the carriage track into contact with the under side of the carriage in which direction it is urged by spring 695. The aperture is so positioned that the carriage covers it and blocks the rise of the finger except when said carriage is in its home position. The lower end of the finger also carries a pivoted latch 696 which projects it through a slot in plate 697, depending from the lower side of the carriage track and is urged into latched position against the lower end of said slot by a spring 698 tensioned between an intermediate portion of the latch and the depending plate 697.

The nose of the latch overlies the actuator clutch control link 121 and is therefore raised at the conclusion of each corrective additive rotation when the actuator clutch is disengaged. If the carriage is out of home position, the finger 693 is unable to rise under urge of spring 695, and the latch merely falls back without effect. If, however, the carriage is in home position, the spring moves the finger through the aperture and concurrently moves link 692 to the right, rocking lever 690 and depressing the tails of underlying latches 605 and 606, thus completely releasing the main division slide 610, which returns to its inoperative position, terminating the calculation. The carriage shift trip slide 582 is, as usual, tripped to its operative position by lever 670, but is returned to inoperative position (see Fig. 7) before being actuated by the action of cam face 621 on the supplementary division slide 620 which depresses pin 622 on the trip slide latching member 585, depressing this lever and positively camming the slide 582 to its inoperative position.

Manually controlled means are provided for terminating a calculation prior to its completion. The calculation may be terminated at the conclusion of its tour of operation in any denominational order by a manual return of the division lever 600 to its inoperative position at any time during the tour of operation. This carries the supplementary division slide 620 (Fig. 12) to its forward position and a cam face 623 formed thereon acts on a lug 624 formed on latch member 606 to release said latch from the notch 611 in the main division slide. The main division slide is, however, maintained in its operative position by latch 605 until the end of the tour of operations when it is tripped by the rocking of the overlying lever 670, the tail of which overlies actuator clutch control link 121. Tripping of latch 605 completes the release of the main division slide 610, permitting it to return to inoperative position and terminating the calculation.

The second latch 605 may alternatively be released by manually operated means under control of the multiplier clear key to terminate the calculation at the end of any cycle of the actuator and before completion of a tour of operations.

The stem of the multiplier clear key is provided with a pin 6051 overlying one end of lever 6052 pivoted to the side wall of the machine at 6053. The other end of this lever has a laterally bent portion 6054 lying in a wide notch in latch 605. Depression of the multiplier clear key rocks the lever 6052, raising latch 605, and provided latch 606 has been released by return of lever 600, this action will complete the release of slide 610, terminating the calculation. This last releasing means for the latch 605 is only used, however, when the machine has been misoperated, as when the division lever has been pulled while no factors are set in the machine, in which case it operates continuously in the subtractive direction and no other means is effective to arrest it.

*Automatic multiplication*

The calculating machine as shown in the patent to Friden No. 1,643,710 is provided with a trip slide for tripping or raising the rear end of the latch lever 121 to release the clutch control lever 115 at the end of a selected predetermined number of rotations of the actuator. Movement of the trip slide 700 serves to raise the rear end of the latch bar 121, and the trip slide is moved by a pin 711 carried by the slide bar 710 which is positioned in variable angular positions, depending upon the predetermined number of rotations of the actuator, by the lever 720, which is provided with a pin 721 engaging in a slot 712 in the slide bar 710. The slide bar 710 is connected to a rack, as disclosed in said patent, which is restrained against movement by a spring and which is moved in a step-by-step movement by a pinion operated by the actuator clutch. The slide bar 710 which carries the pin 711 is therefore moved one step for each rotation of the actuator, and, by variably positioning the slide bar 710, a different number of steps of movement are required before the pin 711 comes into engagement with the step face of the slide plate 700. The next rotation of the actuator after such engagement causes the pin 711 to move the slide plate 700 and thereby disengage the latch bar 121 from the clutch control lever 115.

Normally the slide bar 710 is in depressed position, being normally held in this position by the spring 722 which is connected to the lever 720 which is in turn connected to the slide bar 710. When the slide bar 710 is in its normal depressed position the pin 711 is positioned in zero position, that is, one station below the number 1 position, in which zero position it is shown in Figure 10. When the pin 711 is in this zero position it may oscillate through one step of movement, moving the slide 700 for less than a full step as set forth in Friden Patent No. 1,643,710, thus preventing operation of the trip slide latch.

The unit is provided with a series of keys 730 ranging in value from 1 to 9, and these keys serve to position the pin 711 to automatically control the number of revolutions of the actuator. Depression of the key valued 8, for instance, will position the pin 711 in front of the eighth step on the slide plate 700, so that on the eighth rotation of the actuator the latch bar 121 will be raised and the clutch housing stopped.

The stems 731 of the keys 730 are mounted on the plate 732 and are normally held in elevated position by springs 733 attached to the lower ends of the key stems. Means are provided for holding the depressed keys in depressed position (Fig. 20). Each key stem 731 is provided on its lower end with a hook 734 which is adapted to engage under a complementary hook 735 on the key retaining slide 736. This slide is mounted on the plate 732 and is normally held in forward position by the spring 737 (Fig. 21). When a key is depressed the slide is moved rearwardly and then springs forwardly under the influence of the spring to bring the hook 735 over the hook 734 on the key, thus retaining the key in depressed position. The slide 736 is not provided with a hook in association with the stem of the number 1 key, so that the number 1 key is not held depressed. The operation of the machine is so rapid that when the number 1 key is depressed the operation is almost immediately completed and if a retaining hook were provided in connection with this key and pressure was not released from the key immediately upon its depression, the key would not be released at the end of the calculating operation, because such operation would be completed and the key releasing means would have been actuated prior to the release of pressure on the key. The key 738 at the forward end of the bank of keys 730 is a clearance key and its function is to move the slide 736 to cause the release of any keys 730 which may be held depressed.

Each key stem 731 is provided with a laterally extending pin 739 which overlies a camming notch in the differential bar 740, which is slidably mounted on the plate 732 (Fig. 21). This slide 740 is moved longitudinally to different differential positions upon the depression of one of the keys 730. The slide 740 is connected to a pin 725 (Fig. 10) on the end of the lever 720 by the link 741 which is adjustably connected to the front end of the slide 740. By connecting the link 741 to the front end of the slide, angular variations in the position thereof, due to the movement of the pin 725 about the fulcrum of the lever 720, are reduced to a minimum, thereby preventing error in the machine. By adjustably connecting the link 741 to the slide 740, adjustment of the machine in assembly is rendered simple and it is not necessary to work to extremely close limits in the manufacture of the parts associated with the slide 740.

The slide 740 is provided on its upper surface with a plurality of notches 742, there being one notch associated with each numeral key 730. The notches are provided at their bases with sockets adapted to receive the pins 739, to accurately position the slide 740, and the sides of the respective notches are inclined to different degrees to cause proper movement of the slide upon depression of a key, regardless of the prior position of the slide. One side of each notch 742 is given an inclination corresponding to the value of the associated key and the other side of the notch is given an inclination corresponding to the complement of the value of the associated key. Depression therefore of any key causes positive movement of the slide to the proper differential position from the prior differential position in which it is held by a depressed key, thereby eliminating the necessity of returning the slide 740 to zero position when a key is depressed after another key has already been depressed. The slide is therefore positively moved and the actuating pin 711 associated with the selection trip slide, is also positively moved to differential position upon the depression of any key 730.

Means are also provided which operate upon the depression of one of the numeral keys 730 for moving the latch bar 121 to disengage the clutch housing and permit rotation of the actuator. Arranged at the side of the slide 740 and directly below the pins 739 is a bar 750 which is supported on the parallel links 751 and which is normally held in elevated position in contact with the pins 739 by the spring 752. Due to the inclination of the links 751, depression of a key 730 causes a backward and downward movement of the bar 750 and this backward and downward movement is employed to move the latch bar 121. Mounted on the parallel motion bar 750 is a roller 753 which bears against the front face of a lever 754 which is secured to the shaft 123, to which the plate 120 is secured. Depression of a numeral key 730, therefore, causes the plate to be rocked in a direction to move the latch bar to disengage the clutch control lever 115 from the clutch housing.

Control of carriage shifting in automatic multiplication

The plate 700 is moved to the rear with pin 711, to actuate instrumentalities for terminating the calculation. It is at this point in the operation that it is desired to initiate action of the shift clutch. There is provided therefor a member 760, pivoted to the plate 700 at 761, and abutting at its rear end a laterally bent portion 762 of a lever 763, depending from the control shaft 595. Rearward motion of the plate 700 then, will impart a counterclockwise oscillation to control shaft 595, rocking lever 596 carried on its opposite end, and tripping slide 582 into operating relation relative to tooth 580. As the actuator reaches home position, this tooth 580 contacts the upper end of slide 582, depressing the slide and its pin 593 to raise the shift clutch control arm 566 and engage said clutch. As the clutch starts, cam 590 rocks the latch member 585, camming the slide 582 out from under the arrested tooth 580 and releases the clutch control arm 566 so that the trip clutch will be disengaged and arrested in full cycle position at the end of a single rotation. It will be noted that the automatic shift always spaces the carriage to the left. In performing automatic multiplication, therefore, on a machine constructed according to the present invention, the digits of the multiplier are set up in their natural reading order from left to right, the carriage having first been appropriately set to accommodate them.

Means operable by the carriage shifting means are provided for effecting the release of latched multiplier keys (Figs. 20 and 20a).

The power driven carriage shift link 550 has an offset 550a which acts as a cam to rock the lever 7361, pivoted on plate 732, forwardly on each operation of the automatic shift. The lower end of this lever lies directly in front of a pin 7362 carried on the key latching slide, which is thus moved to the rear in this operation, releasing any key which may be latched by it.

Means are provided under control of the "Add" key 250 for disabling this shift clutch control when said key is depressed. This key 250 is maintained in depressed position during straight adding and subtracting operations, and acts to limit the rotation of the actuator to a single cycle in either direction. For this purpose a link 257 is attached to the lever 252 and has a foot 258 extending under pin 721 of the multiplier pin adjusting mechanism. Depression of the key 250 raises this link slightly, bringing pin 711 into cooperation with the "one" step of plate 700 so that the plate will be moved during the first rotation of the actuator clutch. To prevent undesirable operation of the automatic carriage shift when this takes place, a second link 259 is provided connecting the rear end of lever 252 with an intermediate portion of member 760. Raising of the rear end of lever 252, incident to the depression of the key 250, thus raises the rear end of member 760 so that when it moves to the rear with plate 700, it will overshoot the laterally bent end 762 of lever 763 and omit actuation of the shift clutch.

The movement of plate 700 arrests the actuator by throwing off link 121 from the clutch control bell-crank 115 as set forth in Friden Patent No. 1,643,710. In automatic division a similar throw off of link 121 is accomplished by lever system 660, but the movement of link 121 is sufficiently greater in the division operation to effect rocking of lever 670 controlling the carriage shift. While the movement of lever 670 in automatic multiplication is not ordinarily great enough to operate the automatic carriage shifting mechanism, it is desirable to prevent any possibility of its doing so while the "Add" key 250 is depressed, and means are provided therefor.

The nose 674 (Fig. 10) is slidably arranged by a pin and slot connection upon lever 673 so that in its extended position it underlies lever 670 permitting actuation of the carriage shifting mechanism thereby, but in its retracted position it clears said lever, preventing actuation of the said mechanism thereby. A bifurcated arm of bell crank 675 engages a stud 676 on said nose and the other arm of said bell crank is likewise bifurcated and engages a stud 677 on link 670. The nose 674 is therefore moved into its retracted position by depression of key 250, preventing any possibility of actuation of the carriage shifting mechanism during its depression.

Since the carriage shifting mechanism is disabled during depression of the "add" key 250, it is necessary to provide an alternative means for releasing the multiplier keys which may be used for effecting repeated additions while the "add" key is depressed. The link 760, which is rocked by the depression of the "add" key to disable the multiplier carriage shifting control, has a hooked front end 7364 adapted to engage over a stud 7363 carried by the multiplier key latching bar 736. When the key 250 is depressed, disabling the carriage shift control and consequently rendering the normal multiplier key releasing means ineffective, the hook 7364 engages over the stud 7363 and carries the slide 736 to the rear with plate 700 to release the multiplier keys.

*Power control and interlocks*

Means are provided for controlling the circuit of the driving motor to effect closure thereof only when one of the several machine controls is functioning. A pair of normally open, spring blade contacts 800 (Fig. 1) are connected in series in the motor circuit and are mounted in a suitable insulating block fixed to shaft 801, journaled in the frame. Clockwise oscillation of shaft 801 is adapted to bring the near contact blade against abutment 802 to effect a closure of the contact. One means for producing this oscillation of the shaft comprises a lever 803, fixed to one end thereof and connected by a push link 804, a shouldered end of which is retained in a slot in lever 803 and rod 805, to a lever 806 fixed to shaft 807 journaled in the frame. The lever 806 lies directly behind and in contact with clutch control bell crank 115, so that a rocking of this bell crank to cause engagement of the actuator clutch will rock lever 806 rearwardly, effecting closure of the motor circuit through the linkage just described.

A second means for operating the contacts comprises a lever 810 (see Fig. 18) pivoted to the frame at 811 and supported by spring 812. One end of this lever has a perforated angular portion 813 which receives an angled end of shaft 801 while the other end is provided with a foot 814 underlying arm 815 fixed on one end of shaft 820. This shaft 820 supports three members, any of which may effect its oscillation, the accumulator clear clutch bell crank, the counter clear clutch bell crank, and the shift clutch power control lever 830. Each of these is journaled on the shaft 820 and carries a projection 831 extending into a wider groove in the shaft so that oscillation of any of these members will effect oscillation of the shaft without actuating the other members journaled thereon. Oscillation of shaft 820 by this means depresses arm 815 and foot 814, rocking shaft 807 in the proper direction to effect closure of the contact.

Arm 815, when in its depressed position, overlies a pin 816 on the end of arm 817 fixed to the end of shaft 807 opposite lever 806. Consequently, when arm 815 is depressed it blocks oscillation of shaft 807 and prevents actuation of the actuator clutch bell crank 115. Conversely, when the actuator clutch bell crank 115 is rocked to engage the clutch, the shaft 807 is rocked bringing the pin 816 into contact with the under side of lever 815 and blocking oscillation of shaft 820. This effects an interlock between the clear and shift keys and the main actuator clutch so that neither can be operated while the other is in operation. The shift clutch power control lever 830 has an arm lying directly behind pin 569 on the tail of the shift clutch key 570. It is thus oscillated by depression of the shift clutch key and is maintained in its adjusted position by the cam 832 on the sleeve of the shift clutch, which underlies another arm of the lever, and also maintains the circuit closed during the shifting operation in automatic multiplication operations. In automatic division operations, however, the contacts are maintained closed throughout the computation by the cam end 619 (Fig. 18) of the main division slide 610 which rides over the foot 814 of the contact control lever 810 and maintains it depressed throughout the operation. The shifting fork 616 (Fig. 9), operated by the slide 610, removes the cam 832 from its operative position with respect to lever 830 during division operations, to permit the restarting of the actuator before the shift clutch reaches home position.

An interlock is provided between the clearing keys and the zero multiplier or automatic carriage shift control key, to permit concurrent operation of the two clearing keys but to lock the shift key by the operation of either, and, conversely, to lock both clearing keys upon operation of the shift key.

A locking plate 850 is pivoted beneath the three keys, between the side frame and plate 451, and has edges 851 underlying cam surfaces 852 of the clear key 450 and 475 and an edge 853 underlying notch 854 in the shift key 570. A spring 855 tends to hold the plate in the vertical position as shown in Figure 18.

Depression of either of the clear keys 450 or 475 will rock the plate 850 carrying the edge 853 out of alignment with its notch 854 and thus preventing depression of the shift key 570, while depression of the shift key 570 will engage its notch 854 over edge 853 preventing rocking of plate 850 and thus locking both clear keys against depression.

I claim:—

1. In a motor driven calculating machine having cyclically operable actuating mechanism and a numeral wheel carriage shiftable with respect thereto, a series of keys for initiating operation of said mechanism, latching means for said keys, arresting means controlled by said keys for terminating operation of said mechanism after a number of cycles of operation thereof predetermined by the operated key, means controlled by said arresting means for shifting said carriage, and means controlled by said shifting means for releasing said latching means.

2. In a calculating machine means for initiating an operation, means for latching said means in operative position, a plurality of successively operating means for releasing said latching means, means for selecting the mechanisms for successive participation in said operation, and means controlled by said last named means for enabling one of said releasing means for said latch.

GUSTAV LERCH.